United States Patent [19]

Bailey

[11] 4,017,777
[45] Apr. 12, 1977

[54] LOAD VOLTAGE CLAMPING CIRCUIT FOR VOLTAGE TURN-OFF CHOPPER

[75] Inventor: Ronald Barry Bailey, Erie, Pa.
[73] Assignee: General Electric Company, Erie, Pa.
[22] Filed: Dec. 22, 1975
[21] Appl. No.: 643,268
[52] U.S. Cl. .............................. 318/342; 321/45 G
[51] Int. Cl.² ........................................... H02P 9/10
[58] Field of Search .......... 318/139, 341, 342, 343, 318/345; 321/45 C

[56] References Cited
UNITED STATES PATENTS

| | | | |
|---|---|---|---|
| 3,753,059 | 8/1973 | Berman | 318/341 X |
| 3,761,793 | 9/1973 | Naito | 318/341 X |
| 3,932,800 | 1/1976 | Iwamoto et al. | 321/45 C |

Primary Examiner—A. D. Pellinen
Attorney, Agent, or Firm—James H. Beusse

[57] ABSTRACT

Apparatus for limiting the peak magnitude of voltage applied to a chopper excited load to the magnitude of the source voltage. In a system including a chopper, a smoothing reactor and a load serially connected to a direct current power source, a clamping circuit is connected in parallel with the chopper and smoothing reactor and provides a current path between the load and the direct current source when load voltage attempts to exceed source voltage as a result of commutation transients in the voltage-turn-off chopper. Where the load is a direct current motor, the clamping circuit in combination with a freewheeling diode provides a suppression circuit for power source transients.

4 Claims, 2 Drawing Figures

LOAD VOLTAGE CLAMPING CIRCUIT FOR VOLTAGE TURN-OFF CHOPPER

BACKGROUND OF THE INVENTION

The present invention relates to time ratio control systems, and more particularly to direct current time ratio control systems of the type utilizing a capacitor for periodically commutating a main thyristor.

Control systems for metering electric power from a direct current (d-c) source to a d-c load have long been known. In one prior art approach a plurality of resistances were inserted between a d-c load and a d-c source and the resistances selectively switched in or out of the circuit to vary the average voltage applied to the load. Due to I²R losses in the resistors and the discrete changes in applied power, this approach, although simple, is not as efficient and smooth as is sometimes desired. With the availability of thyristors and more particularly the silicon controlled rectifier (SCR) a better approach, termed pulse control or time ratio control, has become feasible. As applied to systems for controlling power from a d-c source to a d-c load, time ratio control circuits are generally known as chopper circuits.

In time ratio controlled d-c power circuits, the load current conducting SCR is operated in the manner of a rapidly actuated switch thereby repetitively connecting and disconnecting the load to the source. By varying the average percentage of time in any one cycle that the SCR is conductive, the average power applied to the load may be varied correspondingly. In order to provide smooth operation, it is necessary to operate the SCR at a repetition rate such that the inherent characteristics of the load and any additional smoothing reactor will serve to smooth or integrate the pulses of electrical power.

The SCR is a three-terminal device having anode, cathode and gate terminals. When the SCR is forward biased, i.e., the anode terminal is at a positive potential with respect to the cathode terminal, a current signal applied to the gate terminal will cause the SCR to be gated into conduction and to exhibit a negligible anode to cathode resistance. Once gated or fired in this manner, the SCR can only be turned off by subsequently reducing the current through the device to zero and then applying a reverse bias from anode to cathode for a time period sufficient to allow the SCR to regain its forward voltage blocking ability. In practical applications the SCR can be turned off by means of a "commutation" circuit connected in parallel therewith. The combination of the commutation circuit and a load current carrying SCR is referred to as a chopper. A detailed description of SCR devices, chopper circuits and commutation circuits may be had by reference to the SCR Manual, Fifth Edition published in 1972 by the General Electric Company, Semiconductor Products Department, Syracuse, N.Y.

A typical chopper commutation circuit is a "ringing" circuit, i.e., the circuit contains inductive and capacitive components which develop an oscillating or ringing current. A chopper commutation circuit may include, for example, a capacitor, an inductor, several diodes and a commutating SCR. The chopping frequency is determined by the frequency at which the motor-current conducting main SCR and commutating SCR are fired, and the duty factor is determined by the percentage of a period between consecutive firings of the main SCR that has elapsed when the auxiliary SCR is fired. The capacitor is charged from the d-c power source and thereafter discharged in a manner which provides an auxiliary current path such that current through the main SCR is reduced below a conduction sustaining level and a reverse bias potential is effected across the main SCR whereby the main SCR is turned off or commutated. The auxiliary SCR itself is turned off by ringing action in the commutation circuit. In classifying chopper circuits according to commutating methods, two basic types of chopper circuits are known. A first type is termed a current turn-off chopper circuit and a second type is termed a voltage turn-off chopper circuit.

In a current turn-off chopper circuit the capacitor discharge path includes the load current carrying or main SCR which is to be commutated. This characteristic of the current turn-off chopper circuit requires that the load current carrying SCR be oversized in order to accommodate the commutation current in addition to the load current. To avoid the necessity of having commutating current pass through the load current carrying SCR, many systems utilize the voltage turn-off chopper circuit. In this latter circuit an auxiliary path bypassing the main SCR is provided for the commutating current and only a commutating voltage is applied to the main SCR. This commutating voltage is developed by reversing the voltage on the capacitor during the commutating interval. The voltage on the capacitor is essentially equal to source voltage so that the voltage reversal results in substantially twice the source voltage being impressed across the load connected to the chopper. For many loads repetitive application of twice source voltage during commutation may result in damage to the load.

It is an object of the present invention to provide an improved voltage turn-off chopper circuit in which load voltage magnitude is limited to source voltage magnitude.

SUMMARY OF THE INVENTION

In accordance with the present invention there is provided a chopper circuit connected to a direct current source and adapted to meter pulses of power to a load. A smoothing reactor is serially connected between the chopper circuit and the load to facilitate smoothing of the power pulses into an average power level. In order to prevent the peak magnitude of the voltage applied to the load from exceeding the supply voltage magnitude there is provided a clamping circuit connected across the chopper circuit and the smoothing reactor. In a preferred form the clamping circuit comprises a diode poled to conduct current whenever the load voltage magnitude exceeds the source voltage magnitude. In one embodiment a current limiting resistor is connected in series with the doide.

BRIEF DESCRIPTION OF THE DRAWINGS

The novel features which are believed to be characteristic of the invention are set forth in the appended claims. The invention itself, however, both as to its advantages and objects thereof may best be understood by reference to the following description taken in conjunction with the accompanying drawings in which:

DETAILED DESCRIPTION OF THE PREFERRED EMBODIMENT

Figure 1:
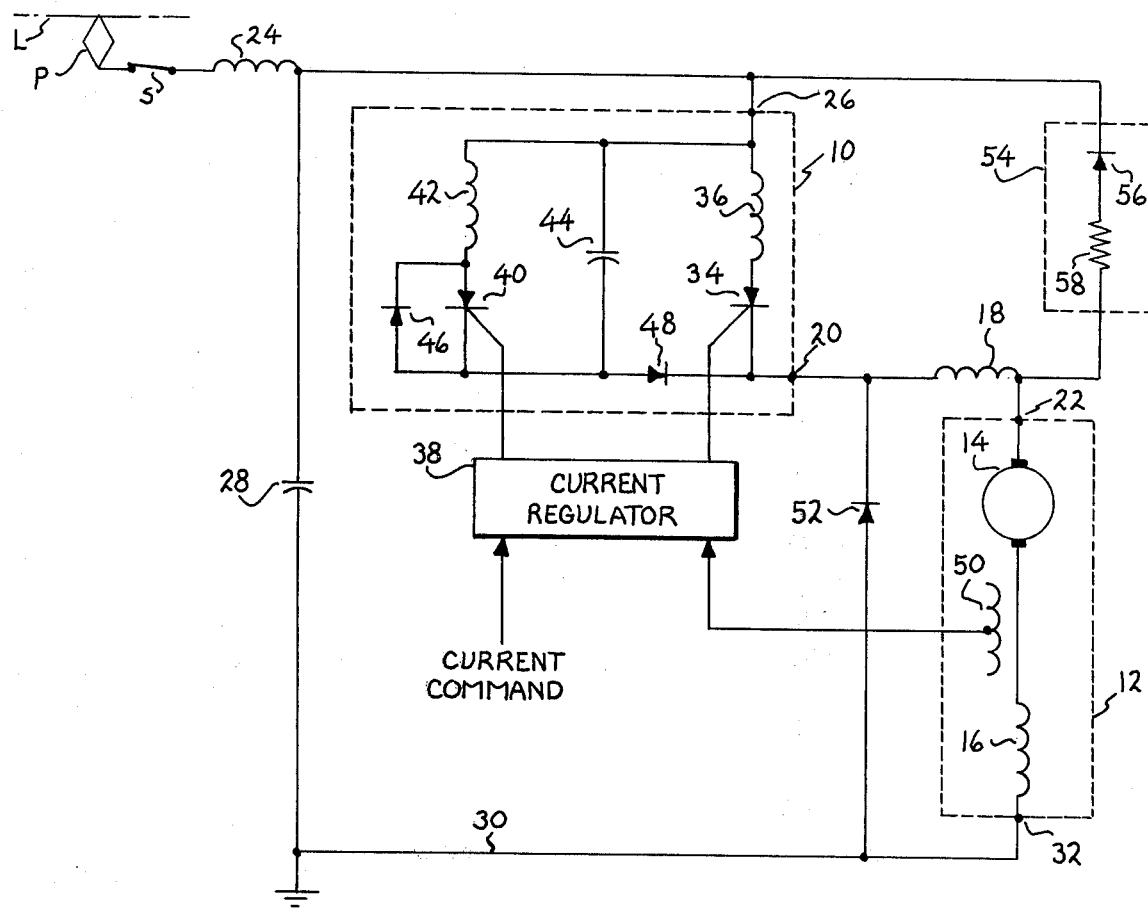
FIG. 1 is a schematic diagram of a chopper power circuit incorporating the present invention.

Referring now to FIG. 1 there is shown a preferred embodiment of the present invention in which a voltage turn-off chopper circuit 10 is connected to meter power to a load 12 comprising a series wound direct current motor having an armature 14 and a field winding 16. A smoothing reactor 18 connects an output terminal 20 of chopper circuit 10 to an upper terminal 22 of load 12. For purposes of illustration load 12 is shown as a traction motor for a rail vehicle wherein power is supplied from an overhead line or catenary L and is conducted by means of a pantograph P, a power switch S and a line filter reactor 24 to an input terminal 26 of chopper circuit 10. A filter capacitor 28 is connected between input terminal 26 and a ground or power return bus 30. A ground terminal 32 of load 12 is also connected to return bus 30.

Chopper circuit 10 comprises a controlled switching device illustrated as a thyristor or silicon controlled rectifier (SCR) 34 and a commutating inductor 36 serially connected between terminal 26 and terminal 20. As is well known, the average power applied to load 12 is proportional to the duty factor or percent-on-time ($\alpha$) of SCR 34. Letting $T_{ON}$ equal the "on" time or conducting time of SCR 34 and $T_{OFF}$ equal the "off" time or non-conducting time, duty factor is defined as $T_{ON}/(T_{ON} + T_{OFF})$. In order to initiate the "on" time of SCR 34, a gate or firing pulse is applied to the gate terminal of SCR 34 by a current regulator circuit 38. In order to terminate the on time of SCR 34, a gate or firing pulse is applied from current regulator circuit 38 to a gate terminal of an SCR 40 of a commutation circuit comprising SCR 40, an inductor 42, a capacitor 44 and diodes 46 and 48. Inductor 42, SCR 40 and diode 48 are serially connected between terminals 26 and 20 with SCR 40 and diode 48 poled to conduct current from terminal 26 to terminal 20. Diode 46 is connected in reverse parallel circuit arrangement with SCR 40. Capacitor 44 is connected in parallel circuit arrangement with the series combination of inductor 42 and SCR 40 with one terminal connected to terminal 26 and a second terminal connected to the junction intermediate SCR 40 and diode 48.

Current regulator circuit 38, sometimes referred to as a chopper control circuit, is of a type well known in the art such as is disclosed in U.S. Pat. No. 3,866,098 - Weiser, issued June 2, 1970 or in co-pending application Ser. No. 638,520 filed Dec. 8, 1975 and assigned to the General Electric Company. The current regulator circuit 38 is connected to receive a CURRENT COMMAND signal from an operator's console (not shown) and to compare this signal to a feedback signal derived from a current transducer 50 in order to control the duty factor of chopper circuit 10 in a manner tending to minimize any difference between the commanded current and the actual current in load 12. To achieve this result, current regulator circuit 38 may vary the time between the application of a firing pulse to SCR 34 and the subsequent application of a firing pulse to SCR 40. As is well known, maximum pwer is delivered to load 12 when SCR 34 is in the conducting state and firing pulses are not applied to SCR 40 so that the chopper duty factor is unity. Minimum power is applied to load 12 when the firing pulses to SCR 34 are inhibited. In general, this minimum power state is characterized by operation of only the commutating circuit, i.e., firing pulses are periodically applied to SCR 40 without application of firing pulses to SCR 34.

Before continuing with a description of the inventive circuit of FIG. 1, the operation of the above-described circuit will be enumerated. With switch S closed, power is available at terminal 26 and capacitors 28 and 44 become charged. A firing pulse applied to the gate terminal of SCR 34 gates this SCR into conduction and allows current to flow from terminal 26 through inductor 36, SCR 34, reactor 18 and load 12 to bus 30. In the illustrated load 12, current flows through armature 14, current transducer 50 and field winding 16. It is noted that current transducer 50 may be any of a number of well known transducers such as, for example, a current measuring reactor, a Hall effect device of a current shunt. After a predetermined time interval such as, for example, 0.001 seconds, a commutating firing pulse is applied to SCR 40 thereby gating SCR 40 into conduction. With SCR 40 conducting, capacitor 44 is placed in parallel with inductor 42 thereby forming an oscillatory or ringing circuit. The charge on capacitor 44 forces a current to flow through inductor 42 and SCR 40 until capacitor 44 has discharged; however, the charge from capacitor 44 is now stored as energy in inductor 42. This energy in inductor 42 thereafter forces current to flow through SCR 40 back to capacitor 44 until the energy in inductor 42 now exists as a reverse charge on capacitor 44. At this time a charge equivalent to the source voltage which existed on capacitor 44 prior to firing SCR 40 has been reversed. Since the upper terminal of capacitor 44 is connected to the source voltage, the voltage at the lower terminal of capacitor 44 is now substantially twice the source voltage. This voltage is applied through diode 48 to the inductance 36 thereby reducing current through SCR 34 to zero causing it to cease conduction. As soon as current through SCR 40 ceases, current begins to flow through diode 46 and inductor 42 until capacitor 44 has "rung" back through inductor 42 and the voltage at the lower terminal of capacitor 44 has fallen to substantially ground potential. SCR 40 is reverse biased during this interval and turns off. During the off time of chopper circuit 10, current circulates through load 12 by means of a free-wheeling diode 52.

As can be seen since the voltage magnitude at the cathode terminal of SCR 34 reaches substantially twice the source voltage during the commutation cycle, the voltage appearing across the combination of reactor 18 and load 12 is also twice the source voltage. In many instances the load will be unable to withstand such high applied voltages. For example, in some rail vehicle applications the catenary voltage is 3000 volts d-c and the resultant voltage appearing across the motor armature 14 and field winding 16 during commutation will reach substantially 6000 volts peak. Unless the motor is constructed with insulation to withstand 6000 volts, arcing and destruction of the motor may occur. However, utilization of a motor having such high overvoltage capability is both impractical from a physical size point of view and from an economic standpoint. Accordingly, the present invention provides a method of limiting peak load voltages and eliminates the necessity of designing a load capable of repetitively withstanding applied potentials which may reach as high as twice source voltage.

The present invention utilizes a clamping circuit 54 to limit the applied load voltage to substantially the magnitude of the source voltage. The clamping circuit 54 comprises a series combination of a diode 56 and a resistor 58 connected between terminal 22 and terminal 26 with the diode 56 poled to conduct current from the load 12 to the source L. Resistor 54 is of a low value and serves, in conjunction with reactor 18, merely to limit current to thereby allow a lower current rated diode 56 to be utilized. Where current limit is not a difficulty, resistor 54 may be eliminated. It is noted that the value of inductance of reactor 18 necessary to provide isolation between chopper circuit output terminal 20 and clamping circuit 54 is not extremely critical. It is also noted that in typical prior art motor applications the inductance of reactor 18 is generally in the range of 50–100 times the inductance of inductor 42. For a value of inductance of reactor 18 of about 10 times the value of the inductance 42, approximately 10 percent of the commutation energy will be lost through reactor 18 and clamping circuit 54. The value of the inductance of reactor 18 is generally dictated by the fault current limit of the load 12 and thus for the typical case where the inductance of reactor 18 exceeds 50 times the inductance of inductor 42, only approximately 2 percent of the commutation energy will be expended through reactor 18 and clamping circuit 54. Thus some variation in the sizing of reactor 18 with appropriate adjustment in the energy capability of the chopper commutation circuit is permissible.

In addition to performing the function of limiting the voltage peaks applied to load 12, the inventive circuit also reduce the average current established in load 12 as a result of operation of the commutating SCR 40 without operating the main SCR 34. In the case of a traction motor as represented by armature 14 and field winding 16, the average motor current established by operation of the SCR 40, i.e., operation of the commutation circuit, would create a minimum torque level since current could not be reduced below this minimum level. With clamping circuit 54 the current applied to the motor by the commutation circuit is reduced since the commutation voltage spikes appearing at terminal 22 are limited to substantially source voltage.

The inventive circuit also provides a low impedance path through diode 52, reactor 18 and clamping circuit 54 for any reverse voltage transients appearing in the source voltage. This feature eliminates the need for clamping of the source voltage at the input line filter capacitor 28 as is commonly practiced. Furthermore, for the illustrated case of a series wound d-c motor load, if the source voltage drops below the counter electromotive force (CEMF) of the motor, little current will flow from the motor to the source since the reduction of forward current through field winding 16 will force a rapid reduction in armature generated voltage of CEMF.

Figure 2:
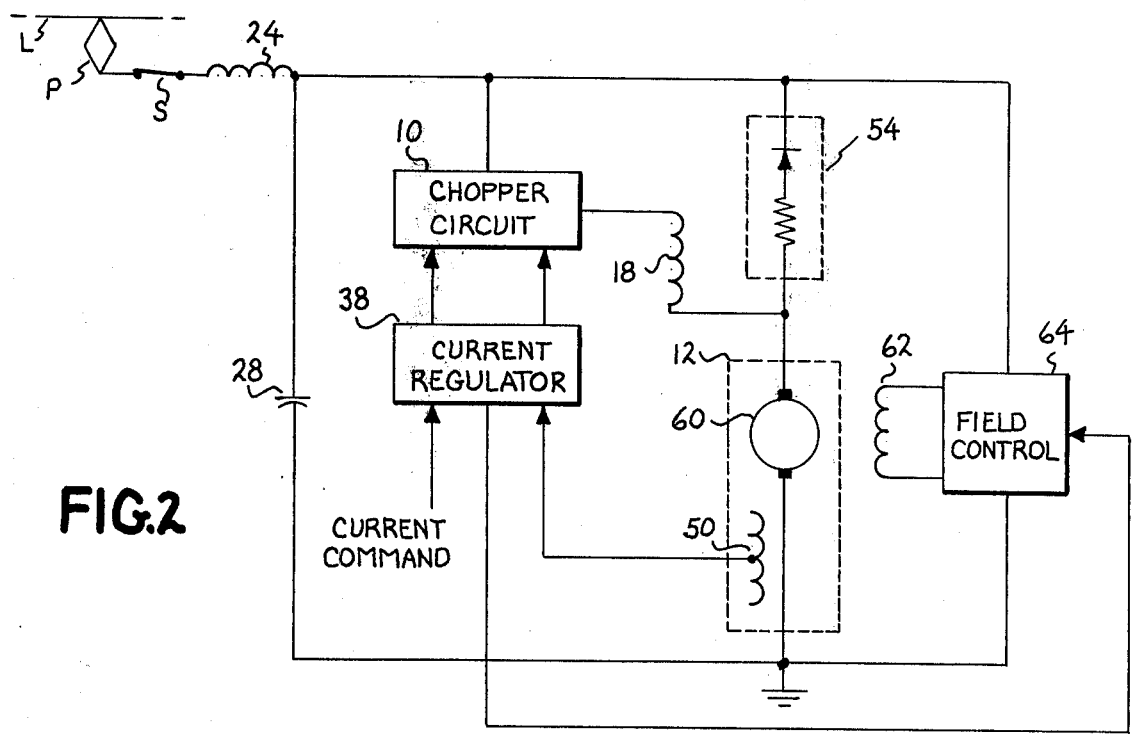
FIG. 2 is a partial block diagram of a modification of FIG. 1 in which the load supplied by the chopper circuit is an armature of a separately excited motor.

Referring now to FIG. 2 there is shown an application of the inventive circuit wherein load 12 comprises an armature 60 of a separately excited motor including a field winding 62. A field control circuit 64 of a type well known in the art, such as, for example, a chopper circuit similar to chopper circuit 10, is connected to receive a current signal from current regulator 38 and is responsive to such current signal to control the excitation of field winding 62. The embodiment illustrated in FIG. 2 demonstrates a further advantage of the present invention for effecting high speed braking. In particular when the motor is operating above the motor corner point, i.e., the point at which the CEMF at full field exceeds the source voltage, the field excitation may be controlled to allow the armature 60 to generate current into the source L and thereby effect a high-speed brake. If, as often occurs with rail vehicles, a rail gap occurs and source voltage is lost, this high-speed brake system may be utilized to maintain a charge on capacitor 28 which charge may be utilized to provide energy for the field control circuit and auxiliary loads.

While the principles of the invention have now been made clear in an illustrated embodiment there will be immediately obvious to those skilled in the art many modifications, constructions and arrangements used in the practice of the invention which are particularly adapted for specific environments and operating requirements without departing from these principles. The appended claims are therefore intended to cover and embrace any such modifications, subject only to the true spirit and scope of the invention.

What is claimed as new and desired to be secured by Letters Patent of the United States is:

1. An electric motor power control system comprising:
   a. first and second source terminals adapted for connection to a source of direct current power;
   b. a direct current electric traction motor having first and second motor terminals and including an armature winding and a field winding serially connected between said motor terminals;
   c. a voltage turn-off chopper circuit including a main thyristor and a commutation circuit and having first and second power terminals and first and second gating terminals, said chopper circuit being responsive to a gating signal applied to said first gating terminal to provide a current path between said first and second power terminals and being responsive to a gating signal applied to said second gating terminal for actuating said commutation circuit to extinguish said current path;
   d. a motor current smoothing reactor;
   e. a voltage clamping circuit;
   f. means connecting said first motor terminal to said first source terminal;
   g. means connecting said first power terminal of said chopper circuit to said second source terminal;
   h. means serially connecting said smoothing reactor between said second power terminal of said chopper circuit and said second motor terminal; and
   i. means serially connecting said clamping circuit between said second motor terminal and said second source terminal whereby commutation voltages produced by said chopper circuit and exceeding the magnitude of voltage at said second source terminal are dropped across said smoothing reactor.

2. The invention as defined in claim 5 wherein said clamping circuit comprises a diode poled inversely with respect to the direction of load current through said chopper circuit.

3. The invention as defined in claim 2 wherein said clamping circuit further comprises a resistor in series with said diode.

4. An electric motor power control system comprising:
   a. first and second source terminals adapted for connection to a source of direct current power;

b. a direct current electric traction motor including an armature and a separately excited field winding, said armature having first and second armature terminals;

c. means connected for energizing said field winding;

d. a voltage turn-off chopper circuit including a main thyristor and a commutation circuit and having first and second power terminals and first and second gating terminals, said chopper circuit being responsive to a gating signal applied to said first gating terminal to provide a current path between said first and second power terminals and being responsive to a gating signal applied to said second gating terminal for actuating said commutation circuit to extinguish said current path;

e. a motor smoothing reactor;

f. a voltage clamping circuit;

g. means connecting said first armature terminal to said first source terminal;

h. means connecting said first power terminal of said chopper to said second source terminal;

i. means serially connecting said smoothing reactor between said second power terminal of said chopper circuit and said second armature terminal; and j. means serially connecting said clamping circuit between said second armature terminal and said second source terminal whereby commutation voltages produced by said chopper commutation circuit and exceeding the magnitude of voltage at said second source terminal are dropped across said smoothing reactor.

* * * * *

UNITED STATES PATENT OFFICE
CERTIFICATE OF CORRECTION

PATENT NO. : 4,017,777

DATED : Apr. 12, 1977

INVENTOR(S) : R. B. Bailey

It is certified that error appears in the above-identified patent and that said Letters Patent are hereby corrected as shown below:

Column 6, line 58, delete "5" and substitute -- 1 --

Signed and Sealed this

Twenty-eighth Day of June 1977

[SEAL]

Attest:

RUTH C. MASON
Attesting Officer

C. MARSHALL DANN
Commissioner of Patents and Trademarks